(12) United States Patent
Lavy

(10) Patent No.: US 11,405,235 B2
(45) Date of Patent: Aug. 2, 2022

(54) MODULAR VEHICLE SENSING, ASSISTING CONNECTED SYSTEM

(71) Applicant: Nexar Ltd., Tel Aviv (IL)

(72) Inventor: Lev Yitzhak Lavy, Misgav Dov (IL)

(73) Assignee: Nexar, Ltd., Tel Aviv (IL)

( * ) Notice: Subject to any disclaimer, the term of this patent is extended or adjusted under 35 U.S.C. 154(b) by 155 days.

(21) Appl. No.: 16/805,720

(22) Filed: Feb. 29, 2020

(65) Prior Publication Data
US 2020/0287745 A1 Sep. 10, 2020

Related U.S. Application Data

(60) Provisional application No. 62/814,258, filed on Mar. 5, 2019.

(51) Int. Cl.
*H04W 4/00* (2018.01)
*H04L 12/40* (2006.01)
*G06N 20/00* (2019.01)
*G06N 5/04* (2006.01)
*G06F 13/42* (2006.01)
(Continued)

(52) U.S. Cl.
CPC ........ *H04L 12/40169* (2013.01); *B60R 11/04* (2013.01); *B60R 16/0231* (2013.01); *B64C 39/02* (2013.01); *G06F 13/4282* (2013.01); *G06N 5/04* (2013.01); *G06N 20/00* (2019.01); *G07C 5/0808* (2013.01); *B60R 2011/004* (2013.01); *B64C 2201/122* (2013.01);
(Continued)

(58) Field of Classification Search
CPC ..... H04L 12/40169; H04L 2012/40215; H04L 2012/40273; G06N 20/00; G06N 5/04; G06F 13/4282; G06F 2213/0042; G07C 5/0808; G07C 5/0825; G07C 2205/02; B60R 11/04; B60R 16/0231; B60R 2011/004; B64C 39/02; B64C 2201/122; B64C 39/024
See application file for complete search history.

(56) References Cited

U.S. PATENT DOCUMENTS 8,949,823 B2 * 2/2015 Ricci ................. G06F 13/14
717/174
9,008,845 B2 * 4/2015 Cho .................. H04L 12/2825
700/276

(Continued)

OTHER PUBLICATIONS

Ignatov et al., AI Benchmark: Running Deep Neural Networks on Android Smartphones, arXiv, 15 pages, Oct. 15, 2018.*
(Continued)

*Primary Examiner* — Frank Duong
(74) *Attorney, Agent, or Firm* — Soquel Group I.P Ltd.

(57) ABSTRACT

A modularized system for assembling electronic systems within vehicles, including a hardware connection unit embedded in a vehicle, a plurality of modules in the vehicle, communicating with the hardware connection unit, either by direct support or by an adaptor, and communicating with each other either by wired or by wireless communication, and a cellular device in the vehicle, communicating with the hardware connection unit and with one or more cloud services, and downloading firmware and software for the modules from the one or more cloud services, wherein the system is viewed and modified using a dedicated smartphone application or a cloud dashboard.

55 Claims, 11 Drawing Sheets

(51) Int. Cl.
*G07C 5/08* (2006.01)
*B60R 11/04* (2006.01)
*B64C 39/02* (2006.01)
*B60R 16/023* (2006.01)
*B60R 11/00* (2006.01)

(52) U.S. Cl.
CPC ............... *G06F 2213/0042* (2013.01); *H04L 2012/40215* (2013.01); *H04L 2012/40273* (2013.01)

(56) References Cited

U.S. PATENT DOCUMENTS

| | | | |
|---|---|---|---|
| 10,650,621 B1 * | 5/2020 | King | H04L 67/10 |
| 2013/0204466 A1 * | 8/2013 | Ricci | G06F 3/0484 |
| | | | 701/2 |
| 2018/0103022 A1 * | 4/2018 | Tokunaga | H04L 63/108 |
| 2019/0143936 A1 * | 5/2019 | Abel Rayan | B60R 25/2045 |
| | | | 701/2 |

OTHER PUBLICATIONS

Fender Bender, Nexar Develops First ADAS App for Android Phones, In-Vehicle Systems, downloadable at www.fenderbender.com, 2 pages, Aug. 3, 2017.*

Li etal, Survey on Artificial Intelligence for Vehicles, Springer, 13 pages, Mar. 19, 2018.*

* cited by examiner

MODULAR VEHICLE SENSING, ASSISTING CONNECTED SYSTEM

PRIORITY REFERENCE TO PROVISIONAL APPLICATION

This application claims benefit of and hereby incorporates by reference U.S. Provisional Application No. 62/814,258, entitled MODULAR VEHICLE SENSING, ASSISTING CONNECTED SYSTEM, and filed on Mar. 5, 2019 by inventor Lev Yitzhak Lavy, the contents of which are hereby incorporated by reference in their entirety.

FIELD OF THE INVENTION

The field of the present invention is systems for detecting and recording collisions.

BACKGROUND OF THE INVENTION

Conventional sensor systems for vehicles today, when it comes to evidence, Advanced Driver Assistance Systems (ADAS) and other capabilities, have very little customizability in components and price points. Upgrading or updating a system usually involves replacing the full unit. An example of such system is the dashcam, where adding cameras is usually limited to adding one internal camera and upgrading the computer chip requires replacing the whole unit, including CCD sensor and housing. Connecting a conventional system to the cloud also requires per component integration and replacement.

Another significant problem is that each component among the car-purchasable components, acts individually making usage, data sharing and aggregation of data very complicated for users. It is especially problematic to provide cellular network connectivity for car accessories sitting at the provider edge.

SUMMARY

Embodiments of the present invention provide modular systems in which every component is separate, and may be plugged and played either by direct support or by an adapter. The modules are combined into one system which the user configures, controls, connects to the cloud, and upgrades as desired.

There is thus provided in accordance with an embodiment of the present invention a modularized system for assembling electronic systems within vehicles, including a hardware connection unit embedded in a vehicle, a plurality of modules in the vehicle, communicating with the hardware connection unit, either by direct support or by an adaptor, and communicating with each other either by wired or by wireless communication, and a cellular device in the vehicle, communicating with the hardware connection unit and with one or more cloud services, and downloading firmware and software for the modules from the one or more cloud services, wherein the system is viewed and modified using a dedicated smartphone application or a cloud dashboard.

BRIEF DESCRIPTION OF THE DRAWINGS

The present invention will be more fully understood and appreciated from the following detailed description, taken in conjunction with the drawings in which.

Solid lines the figures indicate wired connections, and dashed lines in the figures indicate wireless connections.

For reference to the figures, the following index of elements and their numerals is provided. Similarly numbered elements represent elements of the same type, but they need not be identical elements.

| Table of elements in the figures | |
|---|---|
| Element | Description |
| 100 | modular vehicle system |
| 105 | plug |
| 110 | charger |
| 115 | main module |
| 116 | main storage |
| 117 | fan air shaft |
| 120 | USB C connector |
| 125 | AI accelerator |
| 130 | cooling module |
| 135 | communication module |
| 136 | WIFI transmitter/receiver |
| 137 | BLE transmitter/receiver |
| 140 | On Board Diagnostics |
| 145 | hidden storage |
| 150 | smartphone |
| 155 | charger |
| 160 | USB camera |
| 165 | WIFI camera |
| 170 | USB to RTSP adapter |
| 175 | AI module |
| 200 | cloud services |
| 210 | ADAS cloud component |
| 300 | modular vehicle system |
| 400 | modular AI vehicle system |

-continued

Table of elements in the figures

| Element | Description |
| --- | --- |
| 500 | modular multi-node vehicle system |
| 610 | OBD connector and power supply |
| 620 | cable connectors |
| 630 | cable |
| 640 | camera/audio recorder/GPS antenna/cellular antenna/IMU sensors |
| 650 | extendible pole/antenna |
| 660 | spring connector to vehicle roof |
| 700 | vehicle |
| 710 | back door |
| 720 | roof brace |
| 730 | camera |
| 800 | vehicle |
| 810 | drone |

Elements numbered in the 1000's are operations of flow charts.

DETAILED DESCRIPTION

Modular Solution

Embodiments of the present invention relate to a modular vehicle system including three types of components; namely, (1) a hardware main connectivity unit embedded in a vehicle or connected to it, (2) one or more modules in the vehicle, communicating with the hardware connection unit, either by direct support or by an adaptor, and communicating with each other either by wired or by wireless communication, and (3) a cellular connectivity device, which can be a driver's smartphone or a dedicated component in the vehicle, communicating with the hardware connection unit and with one or more cloud services.

The modular vehicle system is modular in hardware and software components that may be added as applications. The system modular vehicle system may be modified and viewed using a dedicated smartphone application or a cloud dashboard. For example, an insurance company may have an application for reducing insurance cost which is installed by registration to the insurance company. The modules may be updated via the cellular device which downloads firmware and software for the modules from the one or more cloud services.

Interconnectivity of Modules

Figure 1:
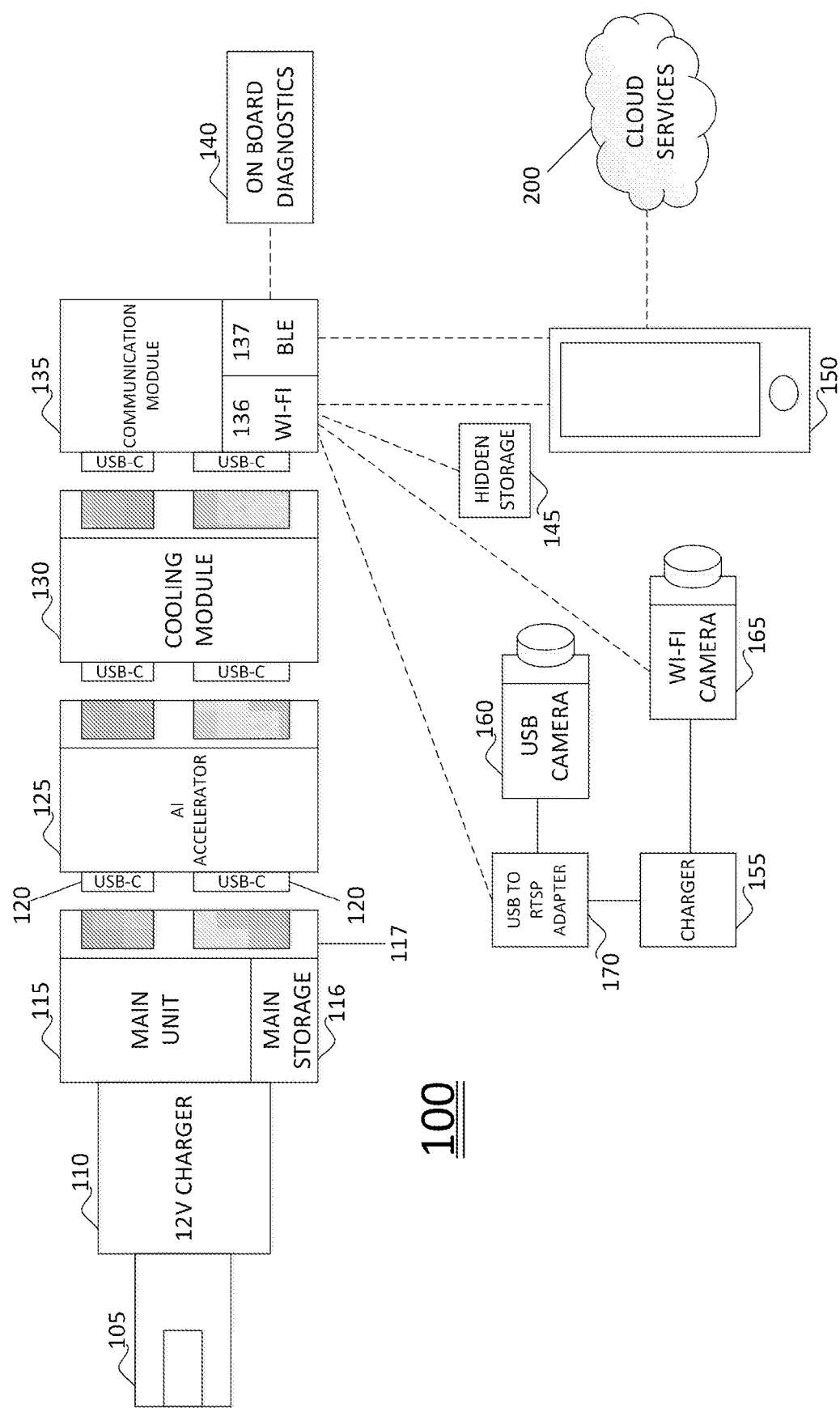
FIG. 1 is a simplified block diagram of an exemplary modular configuration of a vehicle system that enables easy setup and upgrade, in accordance with an embodiment of the present invention.

Reference is made to FIG. 1, which is a simplified block diagram of an exemplary modular configuration of a vehicle system 100 that enables easy setup and upgrade, in accordance with an embodiment of the present invention. Vehicle system 100 includes a plug 105 connected to a 12V charger 110. A main hardware unit 115 connects to charger 110, and includes a main storage 116 and a fan air shaft 117. An artificial intelligence (AI) accelerator 125 connects to main unit 115 via USB-C connectors 120. A cooling module 130 connects to AI accelerator 125 via USB-C connectors. A communication module 135 connects to cooling module 130 via USB-C connectors, and includes a Wi-Fi transceiver 136 and a BLUETOOTH® Low Energy (BLE) transceiver 137.

An On-Board Diagnostics (OBD) module 140 connects wirelessly to BLE transceiver 137. A hidden storage 145 connects wirelessly to Wi-Fi transceiver 136. A smartphone 150 connects wirelessly to both Wi-Fi transceiver 136 and to BLE transceiver 137. Smartphone 150 communicates wirelessly with one or more cloud services 200.

A USB to Real Time Streaming Protocol (RTSP) adaptor 170 connects wireless to Wi-Fi transceiver 136. A charger 155 and a USB camera 160 connect by wire to USB to RTSP adaptor 170. A Wi-Fi camera 165 connects wirelessly to Wi-Fi transceiver and connects by wire to charger 155.

Wired Interconnectivity

Figure 2:
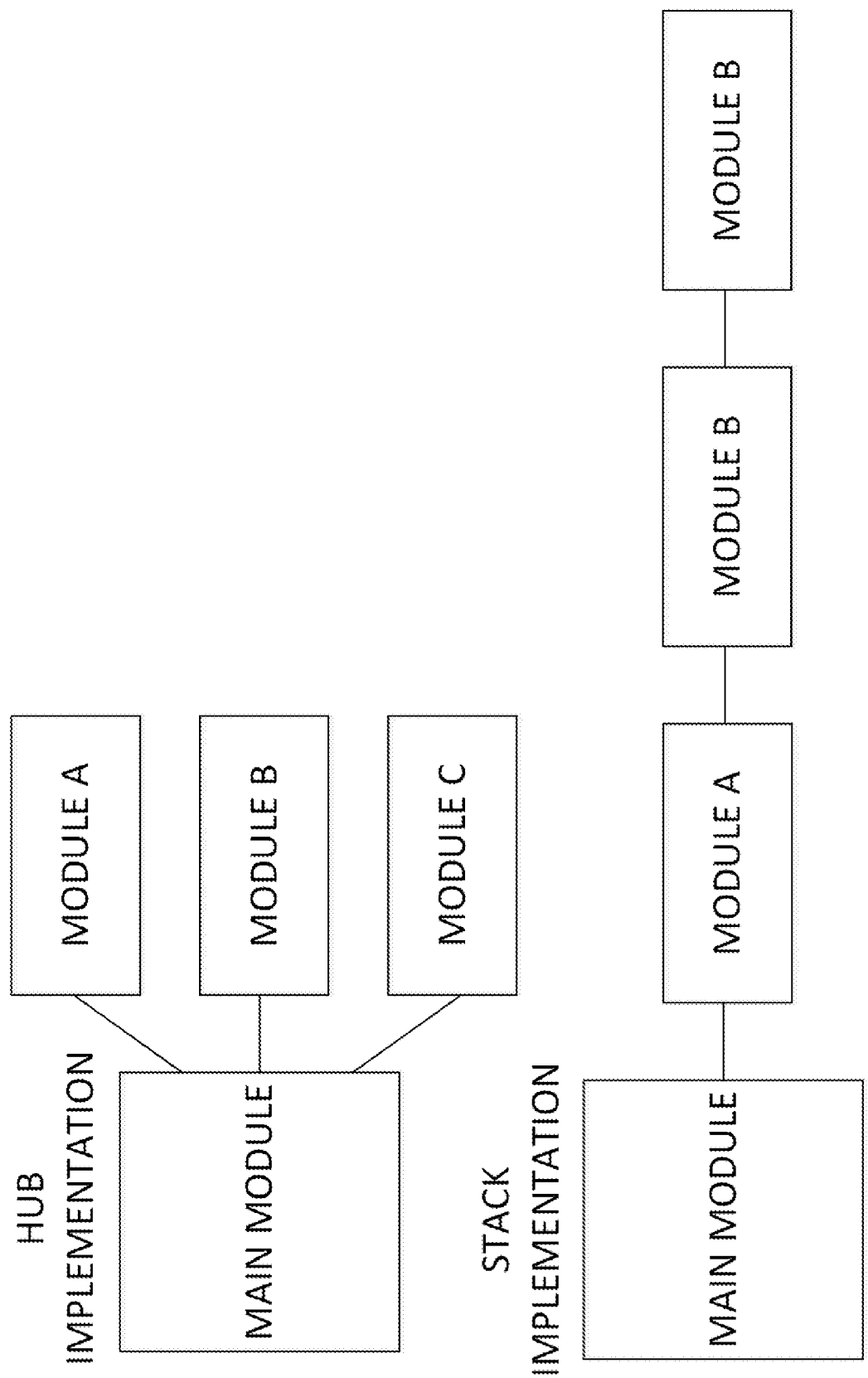
FIG. 2 is a simplified block diagram of hub-oriented and stack-oriented modules, in accordance with an embodiment of the present invention.

Reference is made to FIG. 2, which is a simplified block diagram of hub-oriented and stack-oriented modules, in accordance with an embodiment of the present invention. It may be appreciated from FIG. 1 that the various modules may interconnected in many different ways. FIG. 2 shows hub-oriented and stack-oriented wired connections for a main module and modules A, B and C.

In a stack implementation, each module A, B and C passes its own and the previous module's data to the next module. In a hub implementation, each module A, B and C communicates directly with the main module.

Data and power connectivity in a stacked implementation may also be used for cooling connectivity, whereby components can be connected to each other and to a cooling heatsink/active cooling unit by an air tube or by a heat conductor.

In an alternative embodiment of the present invention, data transmission between modules takes advantage of the vehicle electrical wiring. Specifically, a low amplitude AC signal modulation may be added to a DC signal, not enough to cause a disturbance to the electrical components, but enough to be transmitted and amplified in the modules. This embodiment saves a considerable amount of infrastructure and simplifies installation, and keeps modules communicating by wire for increased security and robustness.

In another alternative embodiment of the present invention, the modules are connected to a vehicle Controller Area Network (CAN) bus, which allows more direct integration with the vehicle and extraction/interaction of data and components.

Both data and energy may be transmitted on a single wire optical cable.

Modules may be interconnected using USB-C, which provides synchronous power and data delivery. USB-C interconnection may be implemented by dual chips or in a hub-oriented fashion. Modules may also be interconnected using Bluetooth, Wi-Fi, or any other hardware and protocol in use today or to be developed in the future.

Common modules include inter alia
1. cameras;
2. geographic positioning systems (GPS);
3. cellular access points;
4. inertial measurement unit (IMU) sensors;
5. OBD modules, including inter alia
   a. chargers;
   b. OBD-II data loggers; and
   c. full data CAN bus connections to the vehicle;
6. cooling units;
7. charging units;
8. solar panels;
9. data storage;
10. Advanced Driver Assistance System (ADAS);
11. navigation systems;
12. processing units, including
    a. graphics processing units (GPUs); and
    b. tensor processing units (TPUs);
13. microphones;
14. speakers;
15. vehicle Internet of Things (IoT) modules, including inter alia
    a. baby monitors;
    b. special sensors; and
    c. anti-theft modules;

16. head-up display (HUD);
17. media centers;
18. lidar and radar;
19. vehicle-to-vehicle (V2V) connection chips; and
20. driver/passenger wearable devices.

Slim Adaptor Embodiments

Figure 3:
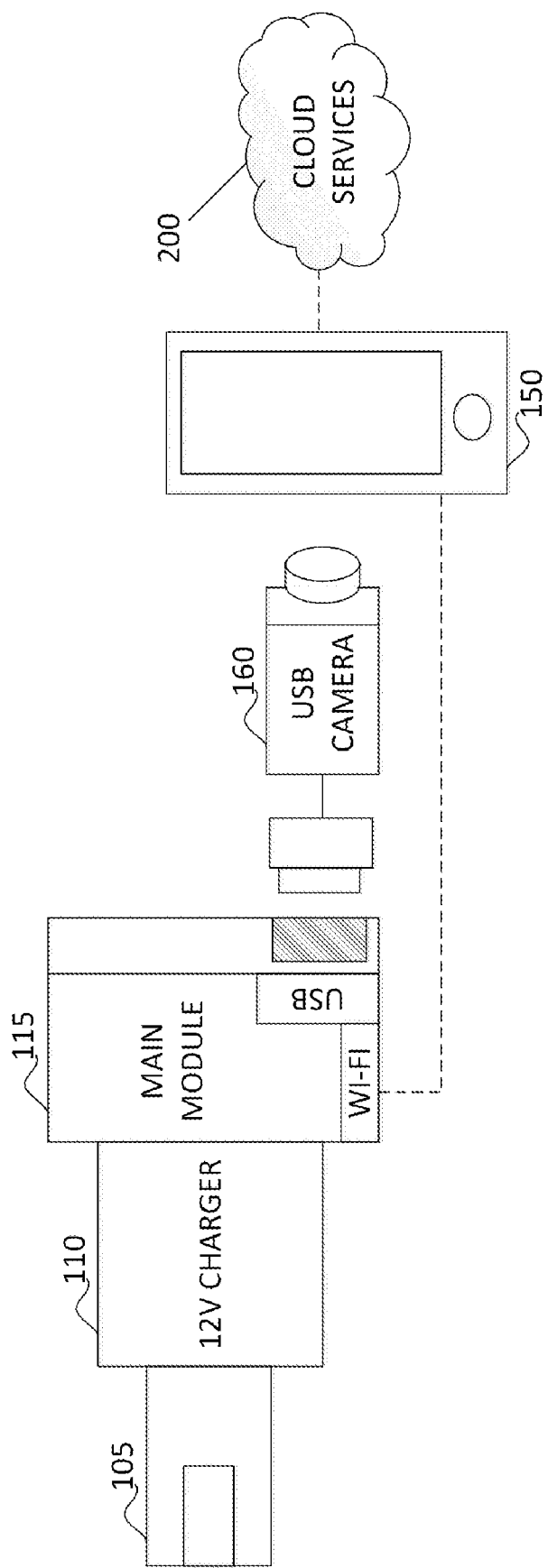
FIGS. 3 and 4 are simplified bock diagrams of basic modular approaches, wherein each camera is connected to a smartphone using Wi-Fi/Bluetooth, and the smartphone functions as a central hub, in accordance with an embodiment of the present invention.
Figure 4:
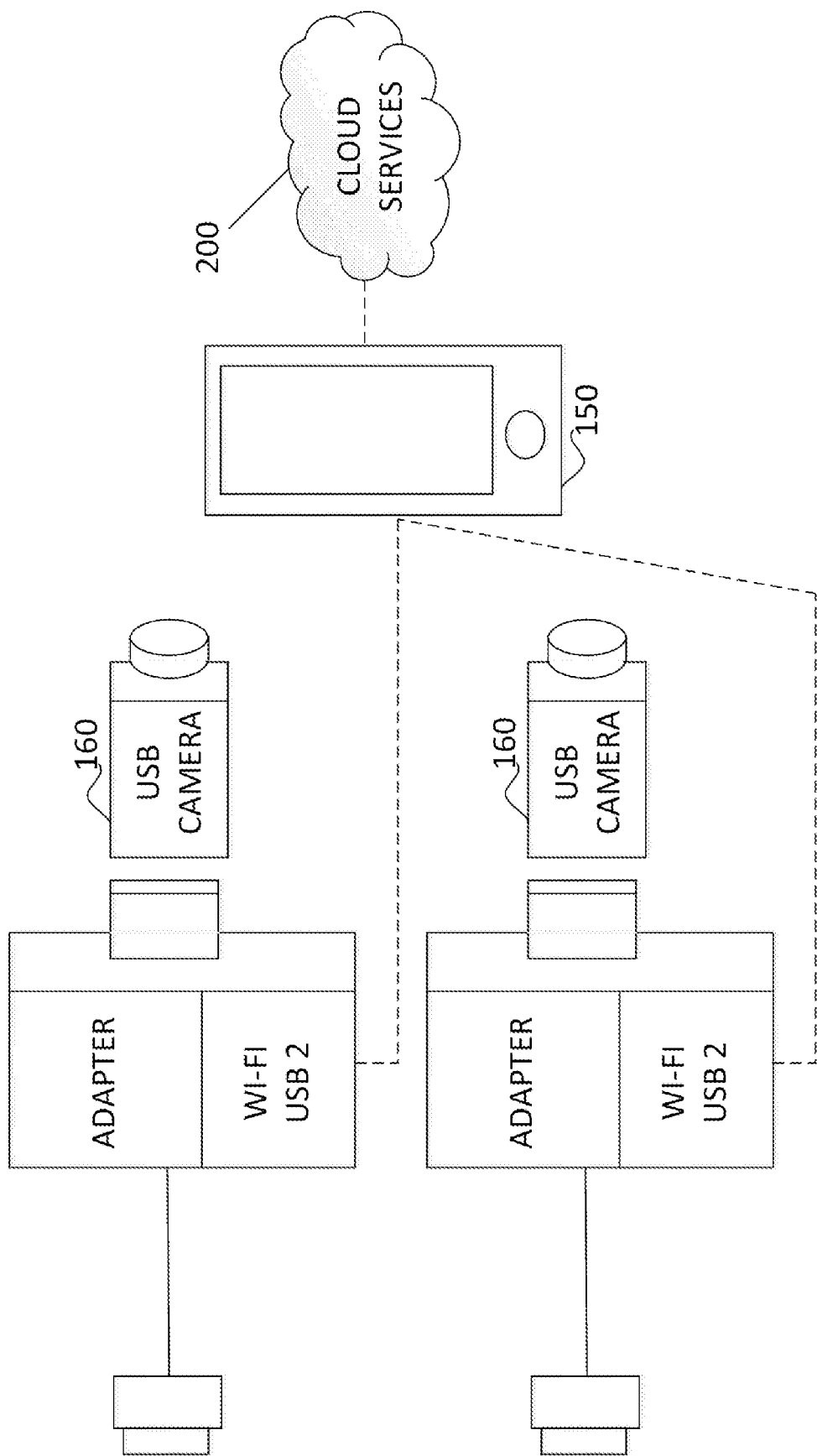

Reference is made to FIGS. 3 and 4, which are simplified block diagrams of basic modular approaches, wherein each camera is connected to smartphone 150 using Wi-Fi/Bluetooth, and smartphone 150 functions as a central hub, in accordance with an embodiment of the present invention. Wi-Fi is used to stream the camera video, audio and other data, and Bluetooth is used to pass initial configurations. A beacon wakes up smartphone 150, and low bandwidth data is transmitted. Smartphone 150 serves as a hub, providing device storage and computing, and providing an access point for cloud storage.

Figure 5:
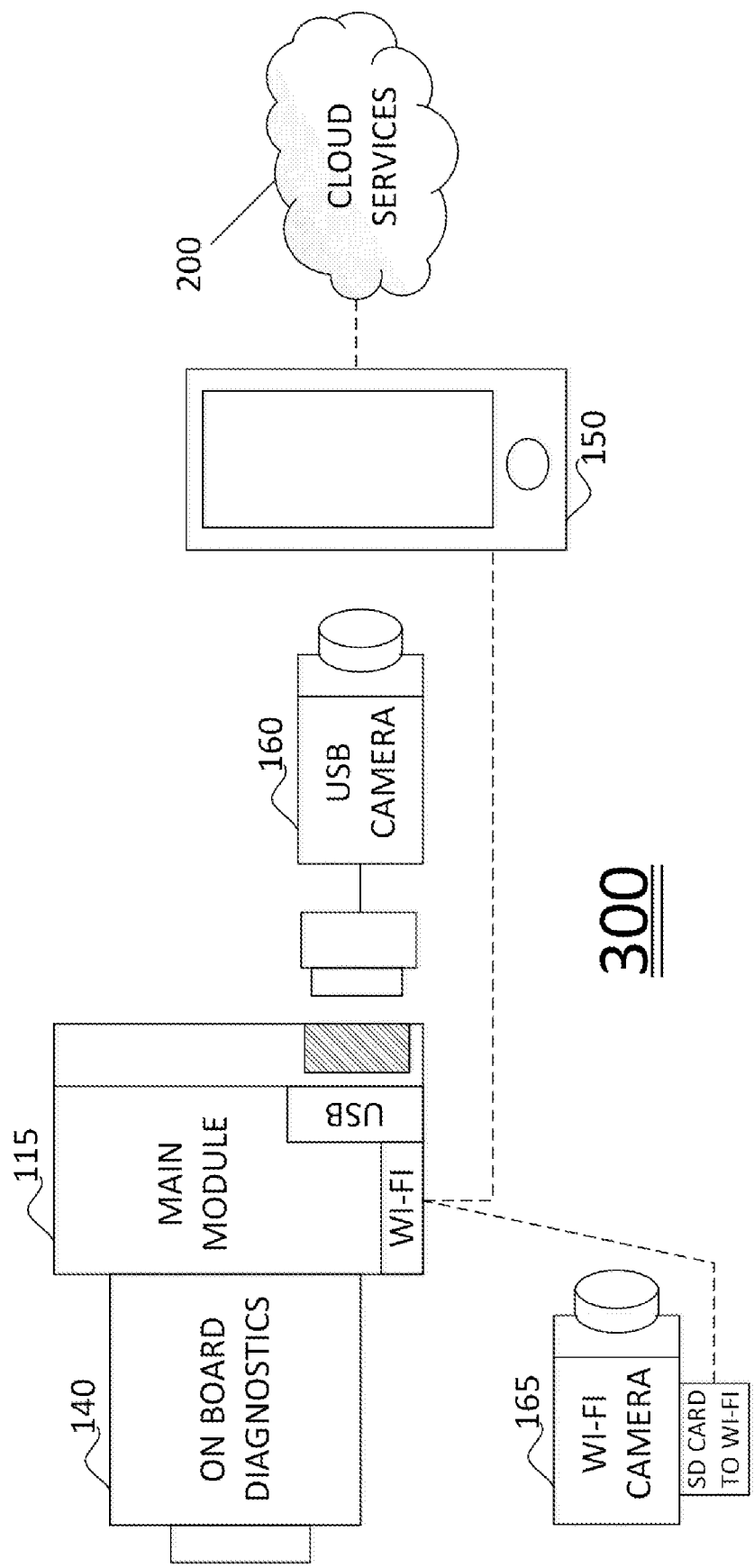
FIG. 5 is a simplified bock diagram of an exemplary modular vehicle system with On Board Diagnostics (OBD) as a main port and with an adapter to a third-party camera in the form of an internal USB and internal SD card adapter, in accordance with an embodiment of the present invention.

Reference is made to FIG. 5, which is a simplified block diagram of an exemplary modular vehicle system 300 with OBD as a main port and with an adapter to a third-party camera in the form of an internal USB and internal SD card adapter, in accordance with an embodiment of the present invention.

ADAS and Other AI Embodiments

Figure 6:
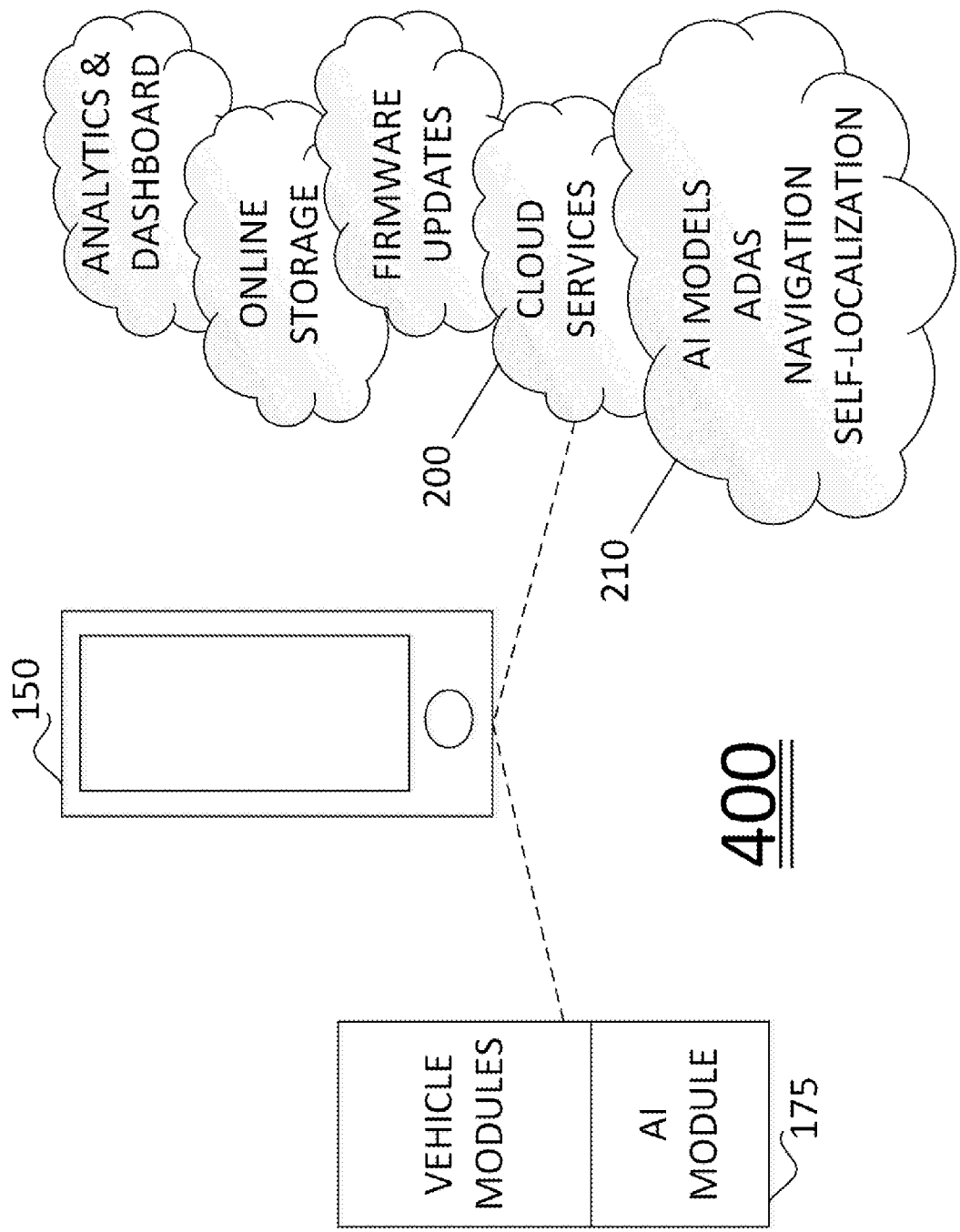
FIG. 6 is a simplified block diagram of serving and cloud components for a modular vehicle AI system, in accordance with an embodiment of the present invention.

Reference is made to FIG. 6, which is a simplified drawing of serving and cloud components for a modular AI vehicle system 400, in accordance with an embodiment of the present invention. FIG. 6 shows an AI module 175, and a cloud component 210 that includes an ADAS component. Since system 400 is highly flexible it is difficult to predict the inputs of the system. To overcome this, embodiments of the present invention use a reinforced approach, where data is gathered from system 400, and system 400 tries to use the data to predict vehicle motion obtained from known sources such as GPS. Then, once an adapter model is trained on a device, a base model is added to run the adapter model. Such an adapter model may be, for example, the location and view of the camera, as well as the camera parameters and calibration, which are detected automatically by system 400. The AI model is served by cloud component 210 to allow over-the-air updates, and to allow use of state-of-the-art models. Alternatively, pre-trained models are used, whereby a user defines the role of each component, and the models run as defined.

Multi-Node, Hub and Main Modules Embodiments

Figure 7:
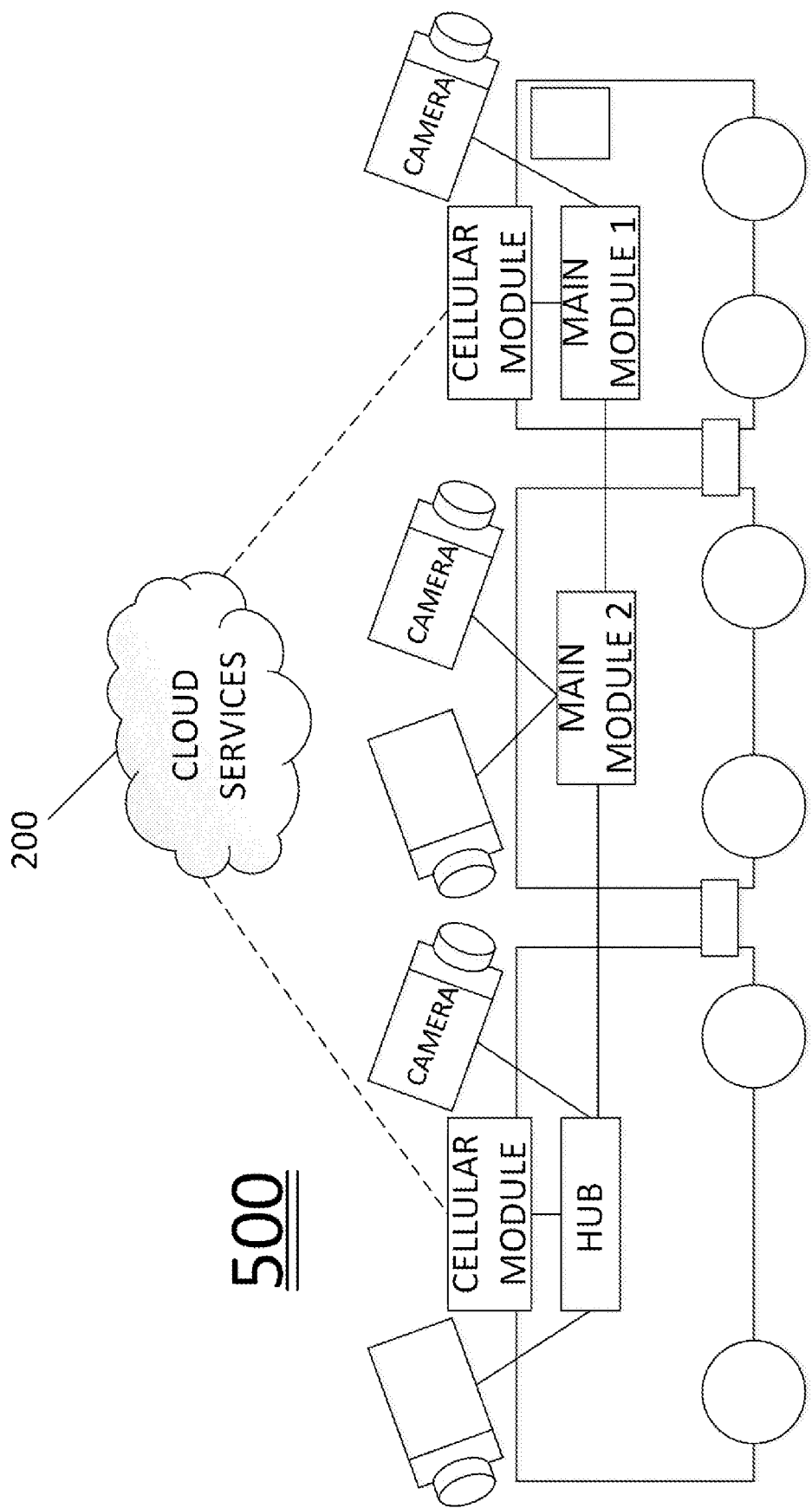
FIG. 7 is a simplified block diagram of a multi-node, hub and main modules system, in accordance with an embodiment of the present invention.

Reference is made to FIG. 7, which is a simplified block diagram of a modular multi-node, hub and main modules vehicle system 500, in accordance with an embodiment of the present invention. In case of a large vehicle, such as a bus, a ship, or an airplane, where users require wide coverage, a large number of modules, and redundancy of evidence, system 500 interconnects multiple main modules and/or multiple hubs. To allow data redundancy in case of a catastrophe, the data units and the cellular access points are physically separated. System 500 may also be used for containers or other detachable vehicle parts, which may include sub-systems/sub-modules.

Smart Storage Embodiments

Each module that creates data may have its own storage for backup/buffering (minimal). A main storage unit may be added in multiple instances and configured to save either clones of recorded data or extend the data lifetime before cycle deletion. If an AI module creates a trigger by processing the data, or by other triggers such as a manual button or a sensor-based algorithm, an event across storage units in all modules is created to mark part of the data for different deletion modes, as never-to-be deleted or as delayed deletion. In response to an event, any module supporting a higher level of sensing may be reconfigured to capture higher rate/resolution/bitrate for a defined duration, for example, to allow slow motion in case of a hard brake so that a collision that happens after the brake is captured in slow motion.

A long memory module may be added, which processes data to "forget" data that is deemed less important and to further compress data. This is done while the system is running or idle, to allow harvesting of all the system compute power. When multiple storage units exist, and the configuration is set for redundancy, the sync of data between the storage units is performed by the main module, or alternatively the sync may be configured to be performed directly by communication between the storage units. To allow data integrity across the modules, the main module syncs clocks at connections. The system may treat a mobile phone as an additional storage unit.

The cellular device may sync data with a cloud storage when a cellular connection is available. The cloud storage is generally set to the never-to-be-deleted mode. A user may set a policy of when and where the cellular device syncs data from the modules with the cloud storage. The policy is configurable via Wi-Fi communication using a home Wi-Fi access point or a public Wi-Fi access point, or via cellular communication. The user specifies a data profile and a data rate for each module and for each available Internet network, such as home Wi-Fi, which may be available when the vehicle is parked at home, and cellular.

Pairing Devices

To secure system operation, once a device is connected wirelessly it is paired to the system, and all of the passwords are automatically regenerated and saved to the dashboard and notified to the user to enable detection of abuse. One method to overcome external attempts to hack the system is near-field communication (NFC). Both NFC and low range BLE may be used to pair new components which are wireless. In addition, fully automatic pairing may be performed once the device is powered and a valid main module exists, after which it generates secured communication. Upon additional of a component, a notification may be sent to the driver or the system owner to verify the change in the system state, for security reasons.

System Health Monitoring

Each module has internal self-tests and additional data integrity tests. Upon failure the module reports to the main module, which communicates to the services. If an audio or visual alert indicator exists, it is also triggered.

A priority of embodiments of the present invention is to provide transparency of operation to users. As such, any issue is displayed in a dashboard and also transmitted, by all means of communication, to the user, sending him to the nearest repair shop or instructing him on further action. In some cases, failure in one component may also trigger an incident event recording of all systems with upload to the cloud.

One of the cloud rules is to further monitor incoming data and provide analytics, of which health of the system is one analytic; for example, by analyzing up-time of the system and checking that the system was up from end to start point of each ride GPS coordinates, so as to provide coverage for all of a user's ride.

In case of OBD connectivity the health monitor also monitors the vehicle itself.

Vehicle Top-View Camera Component

With a conventional dashcam the view of the vehicle is internal, and collision detection and reconstruction are only partial and depend on extrapolation of dynamics. As such, on the one hand it cannot properly avoid fraud, and on the other hand, it allows detection of minor events such as side mirror damage by a passing vehicle. To achieve better coverage, 4-6 cameras are generally deployed, which significantly raises cost and still does not provide the desired level of confidence in the damage and in detection. There are some dashcams that provide a 360° view. They actively cut the front 210°, and then use the remaining 150° for the cabin, image rectified. These type of dash cams are nice, but not good enough solutions to provide a true outdoor 360° view (sides and rear).

Embodiments of the present invention include, in a basic form, only one camera with a wide angle on top of a mast/antenna or other rooftop attachable structure. Alternatively, the camera replaces the antenna or is attached to it. The camera is split into two components, one component including the primary electronics and storage, is inside the vehicle. The second component includes the camera sensor and other sensors/antennas (GPS, microphone, Wi-Fi for mapping, etc.) is positioned on top of a pole. This minimizes the vehicle rooftop part to a minimal weight and size required to host the lens and CCD sensor, while other components reside in the vehicle. The height is adjustable in some implementation of antennas, and flexible so as to allow it to flex if hit. In some embodiments the field of view is larger than that of traditional cameras, to allow lowering the structure, or alternatively the system includes multiple cameras in the same unit. The main vehicle rooftop casing may include a flexible shock absorber, such as rubber, to soften the impact in case the top part hits a ceiling. The camera orientation is such that both the road ahead and the full view of the vehicle from the outside are visible, thus allowing any form of contact to be detected. To prevent hitting surrounding people or property in case of a structural failure, the data cable/power cable also acts as a safety secondary attachment to the vehicle, so that the structure is not fixed but still attached to the vehicle.

The device split of the storage and main compute units with the charger and the camera also allows low cost replacement in case of damage to the external part, reducing cost by 5×-10×.

Figure 8:
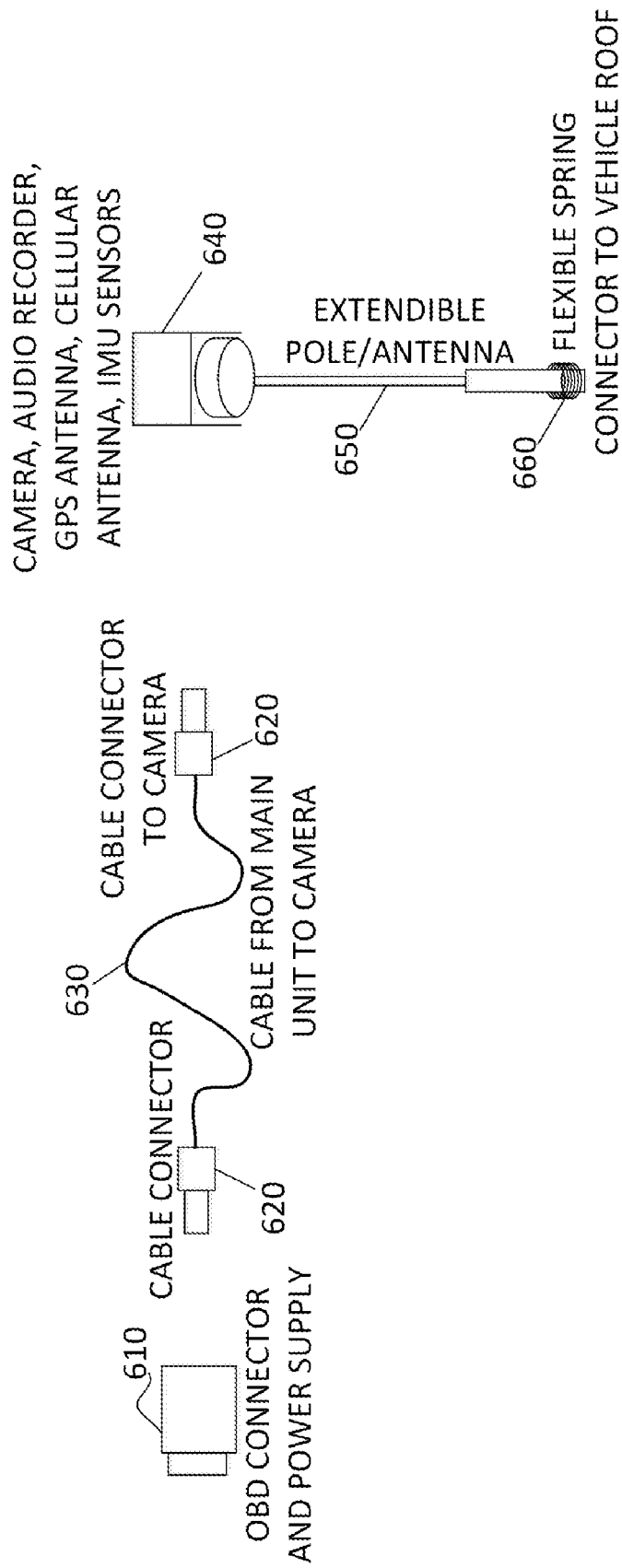
FIG. 8 is a simplified diagram of a standalone unit on top of an antenna/pole, in accordance with an embodiment of the present invention.

Reference is made to FIG. 8, which is a simplified diagram of a standalone unit 640 on top of an antenna/pole 650, in accordance with an embodiment of the present invention. FIG. 8 shows an OBD connector and power supply 610, and a cable 630 and cable connectors 620. Unit 640 is mounted on an extendible vehicle antenna/pole 650, having a flexible spring connector 660 to a vehicle roof. Device 640 may be inter alia a camera, an audio recorder, a USB antenna, a cellular antenna or an IMU sensor. If necessary, the whole unit may be a standalone unit on top of antenna/pole 650, but this generally increases the weight per antenna diameter needed. As such, a two-component system is preferred.

Additional benefits include audio recording without issue of privacy, allows better reconstruction of events and also detection of upcoming events. In distinction, in-vehicle audio recording is limited due to the vehicle hull which is built to isolate external noises. Additional benefits also include better handling of glare from the sun, as the camera tilt prevents most overexposure.

In embodiments of the present invention internal units may be charged either by an internal connection or by standard ports. Specifically, an OBD port allows the system to both gather vehicle dynamics and error codes, and also allows charging of 12V. A cigarette lighter, also 12V, is simpler for some users to connect, but provides no additional vehicle information.

The pole may be connected in the antenna socket alone. Similar to how flags are attached to a window, the camera may also be connected from more than one side.

Figure 9:
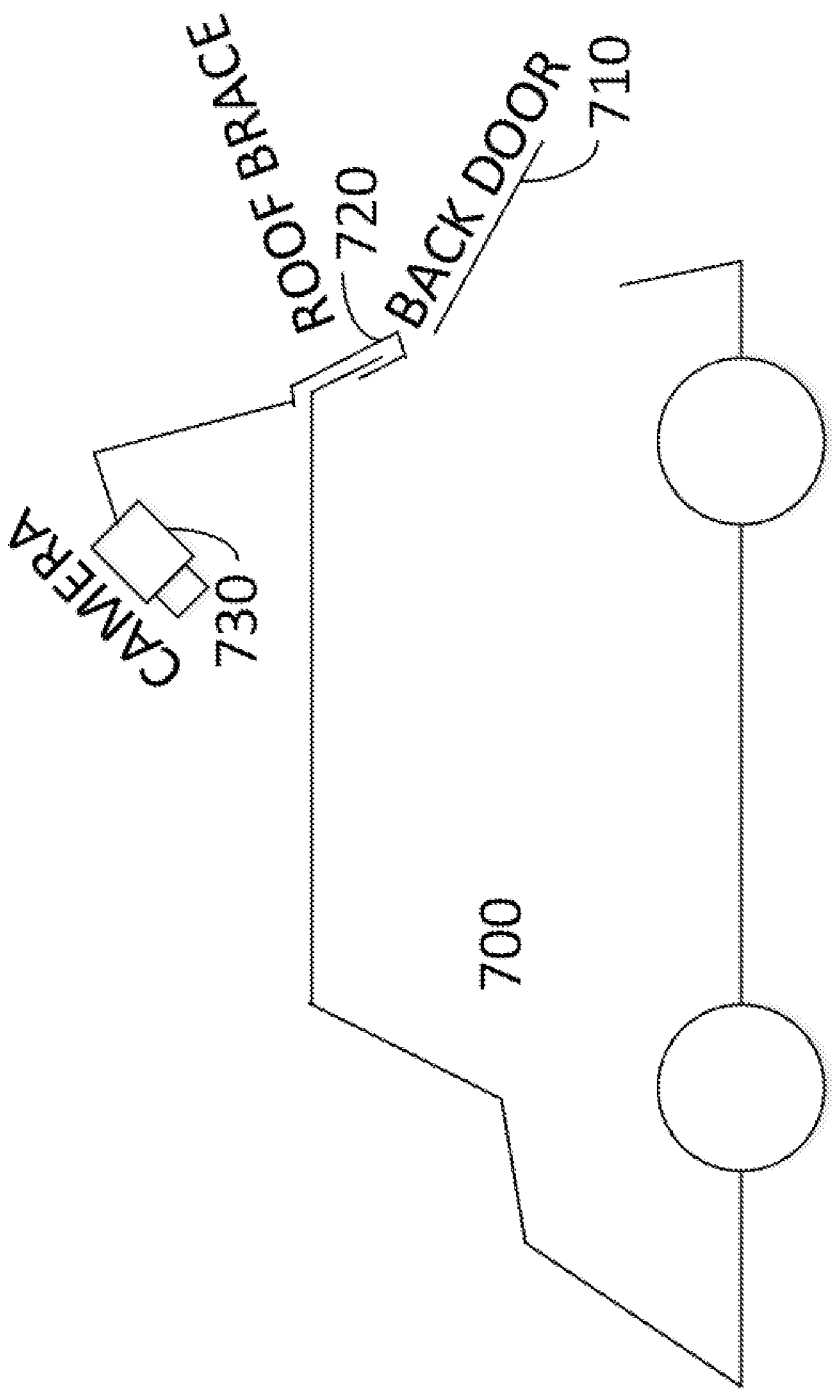
FIG. 9, which is a simplified diagram of a camera mounted on the top of a trunk door of a vehicle, in accordance with an embodiment of the present invention.

Reference is made to FIG. 9, which is a simplified diagram of a camera 730 mounted on the top of a trunk door 710 of a vehicle 700, in accordance with an embodiment of the present invention. From the top of trunk door 710, camera 730 has a brace 720 that is wider up and thin, so as to avoid disturbing opening and closing of the trunk. Second and third stabilizing legs with soft footing may be added. The legs use either a suction cup, or such soft form to prevent scratching the roof. A magnetic holder may be added to further prevent damage in case of a hit, instead of the spring.

In accordance with a basic embodiment, the present invention includes one wide camera, since a narrow camera will only show the roof. Most common is a 110°-170° view where the wide view (not symmetric) is placed along the vehicle forward axis. The vehicle rooftop may be used for image stabilization as a visual anchor, and it can help significantly to reduce pole vibrations. A 360° camera may be used to allow an even wider view of the surrounding. A multi-configuration system with integration of an additional camera from within the vehicle may also be added for additional coverage.

Adding an engine in the pole base allows camera 730 to be active and to bend towards areas of interest, to bend against the sun, and to bend to balance wind forces. A power connector may be passed above the vehicle door, through a hole in the roof, or without a physical connection using induction on the back/front window or even direct current on the roof. To enable a view over the vehicle ahead, a motor to extend the height of the pole may be added allowing an even higher elevated view of the area.

Drone Component

A vehicle view is very limited, and moreover in case of emergency a vehicle may have connectivity issues to the cloud.

Figure 10:
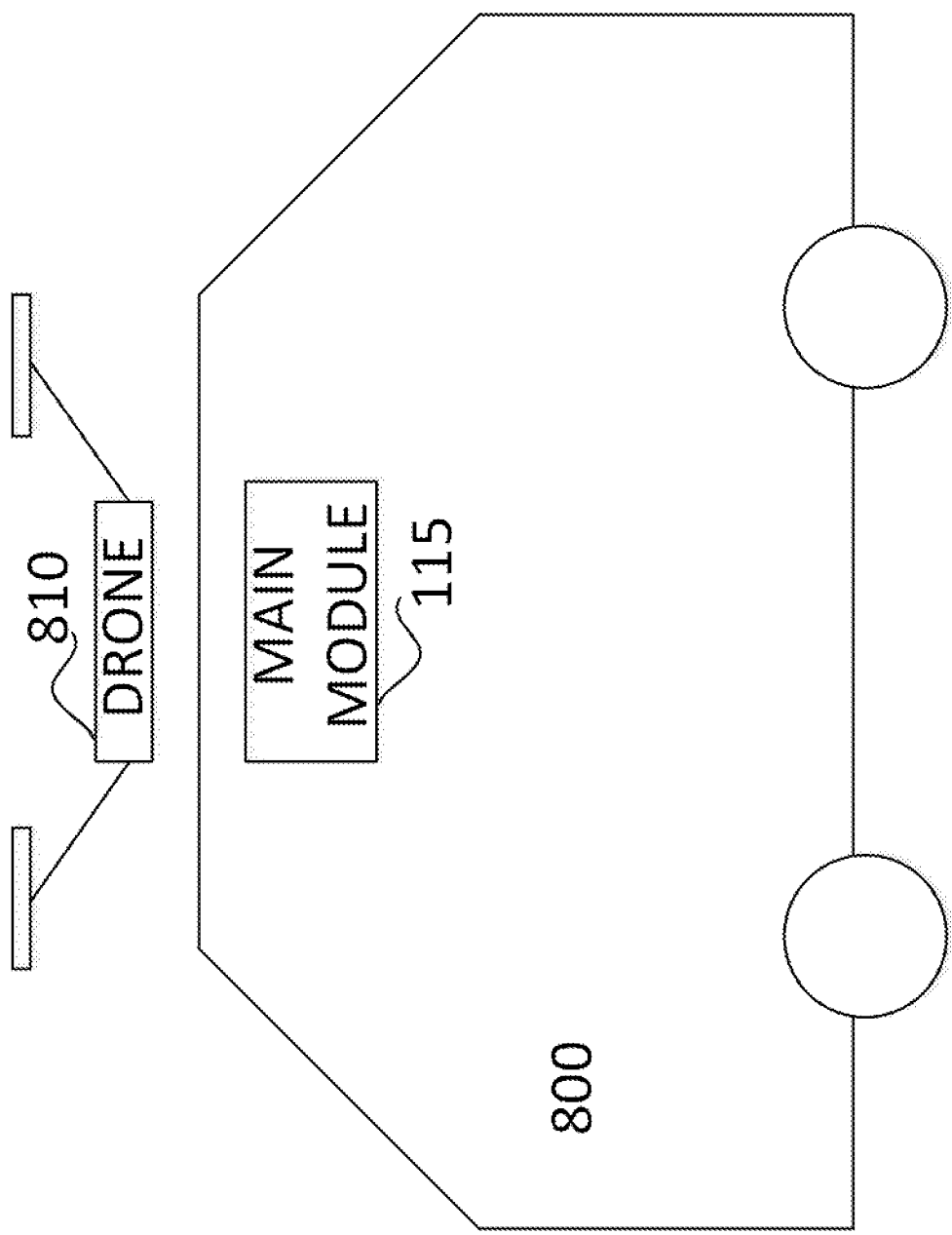
FIG. 10, which is a simplified block diagram of a drone attached to a vehicle, in accordance with an embodiment of the present invention.

Reference is made to FIG. 10, which is a simplified block diagram of a drone 810 attached to a vehicle 800, in accordance with an embodiment of the present invention. Drone 810 may be lifted in case of collision detection, or in case of a need for other communication. Drone 810 contains a data storage unit to hold evidence, a camera, a GPS, and a cellular module. In case of an emergency event drone 810 automatically flies to the last spot of cellular connectivity, and transmits emergency data.

In case of congestion or other road blockage, drone 810 flies above them to detect issues, and flies back to the vehicle roof where a lock is, for example, magnetically activated.

Octopus Camera Array

360° cameras and regular cameras have road coverage issues. A 360° camera, for example, is limited to one position and usually one CCD that may be saturated from a single source of light.

According to an embodiment of the present invention, a multi-camera array on all sides is used, with cheap cameras having overlapping fields of view, harvesting the modular camera approach. Many modules may be deployed, cheaply but very effectively.

The overlapping configuration may be combined with vehicle interior cameras and other views to automatically build a merged 3D combined view. The compute is carried by one of the compute sub-models and further enhanced and accessed on the mobile app and cloud services.

Cable-Less Components: Collision Detection Stickers

Figure 11:
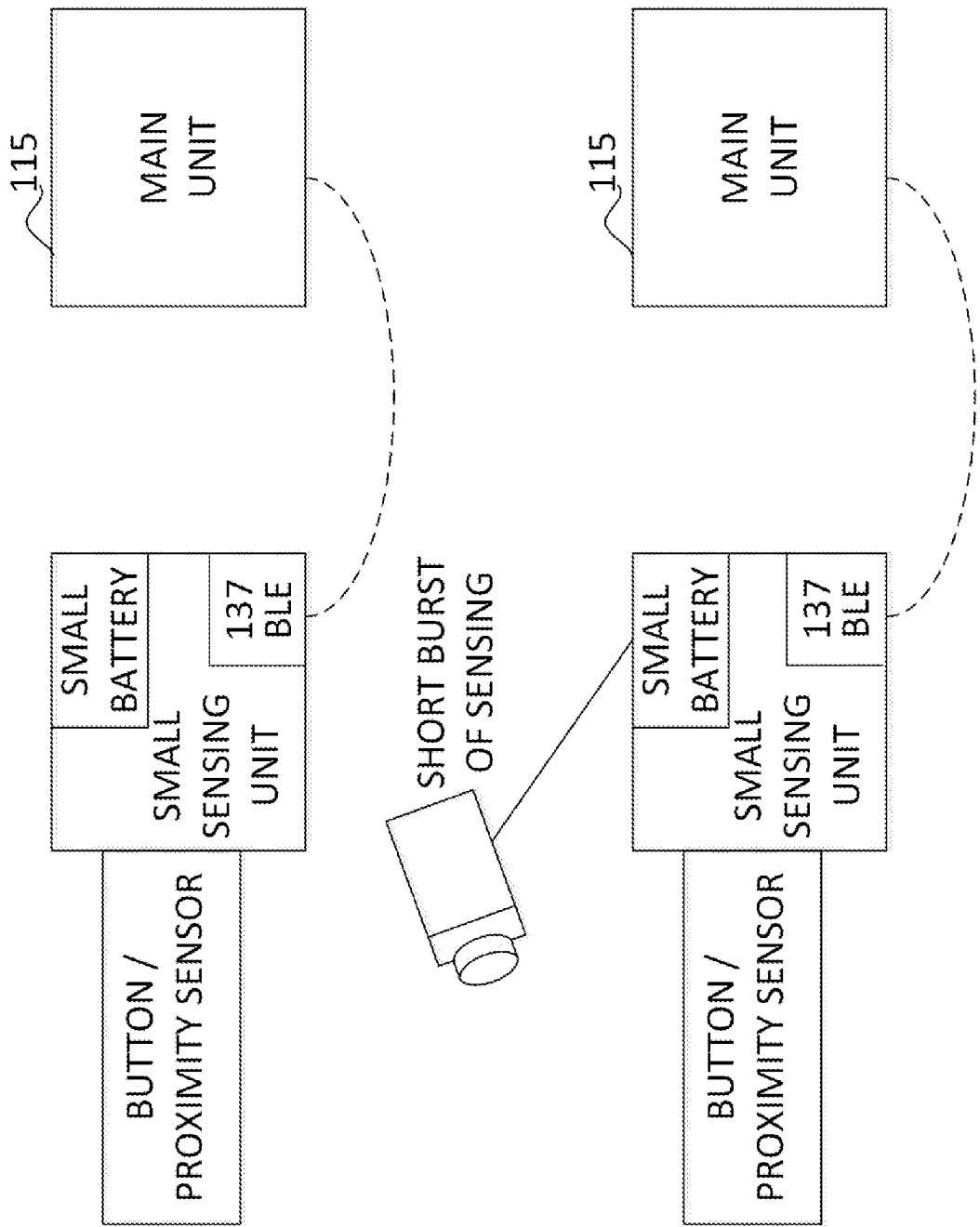
FIG. 11, which shows use of stickers to detect a collision in specific areas of a vehicle, in accordance with an embodiment of the present invention.

Reference is made to FIG. 11, which shows use of stickers to detect a collision in specific areas of a vehicle, in accordance with an embodiment of the present invention.

Attaching a camera to detect collision in a specific area of the vehicle is generally very difficult and costly. Even if most of the area is covered by vision, there are hidden/dead spots in which a collision may be costly yet hard to detect. When the ratio of the vehicle mass and the second body is large, e.g., a track and a pedestrian, a collision is also difficult to detect with an IMU.

A passive BLE sensor, which is activated in response to a force upon it, similar to an on-off button, triggers a short burst of sensing, or triggers an event in the simplest module. This allows a very limited battery, or even no battery at all, to trigger a collision event and a short video/audio.

The sticker has no need for a cable, and is based on fixed/replaceable/rechargeable battery. BLE transmits a live signal and unit test. BLE transmits triggers of events for the main system. BLE transmits a battery state. A battery-free mode is achieved by dynamo, such that impact charges a capacitor. However, in such case no keep-alive is available. A heavily-powered component may be connected and activated upon collision to capture, for example, in case of a rear-end collision, the license plate of the hitting vehicle; as it is only shot burst, it can sustain many hits.

Advanced Audio Recorder Component

In some cases, vision alone cannot detect impending danger to a vehicle and additional evidence may be gathered for incidents when audio is available from outside of the vehicle. For internal audio recording and interface with the driver and passengers, a simple microphone does not do a proper job.

In accordance with an embodiment of the present invention, a customizable multi-array microphone system is used, where each microphone is placed as an additional module and configured to a role either manually or automatically. A small extension to the modular camera with an audio cable that is positioned in a selected location inside/outside of the vehicle, and attached to the vehicle either using a magnetic connector or an adhesive. Outside of the vehicle it also has an option for windshield, to avoid only recording wind in high speed. A microphone attached inside of the vehicle engine compartment allows recording of collision and engine failure detection. A microphone array in the vehicle allows per driver/passenger interaction and conversation capture with a media center/AI activated services, and separation of collision audio from radio/media playback and other interferences. A vehicle rooftop microphone array to detect incoming dangers with direction.

Wearable Connected Components

One key component of the system is the driver/passenger himself. Nowadays many drivers and passengers are wearing smart watches/camera glasses and other forms of wearable devices which hold sensory data of the surrounding and even the driver own health. As such those components usually have connectivity to the mobile phone and can be directly connected to the modular camera system and/or to a mobile app. This latter can provide addition trigger for incident/another alert interface. In addition, all of this information may be stored in the cloud for analytics and evidence provided to the user.

It will thus be appreciated by those skilled in the art that embodiments of the present invention provide a modular vehicle system with widespread advantages. The modular vehicle system is user-driven, and is that is modular, and also "after-market", in the sense that a user may install the modules over existing vehicle systems.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

The invention claimed is:

1. A modularized system for assembling electronic systems within vehicles, comprising:
   a USB-based hardware connection unit embedded in a vehicle;
   a plurality of modules in the vehicle, communicating with said hardware connection unit, either by direct support or by an adaptor, and communicating with each other either by wired or by wireless communication, wherein some or all of the modules stack on top of one another such that each module in a stack passes its own and the previous module's data to the next module; and
   a cellular device in the vehicle, communicating with said hardware connection unit and with one or more cloud services, and downloading firmware and software for said modules from the one or more cloud services,
   wherein the system is viewed and modified using a dedicated smartphone application or a cloud dashboard.

2. The system of claim 1 wherein said cellular device is a smartphone and wherein said plurality of modules comprises sensors from the group consisting of a camera including a vehicle rooftop camera, a drone, a GPS, wearable electronic devices comprising smart watches, camera glasses, and health monitors, a cellular access point, inertial measurement unit (IMU) sensors, an on-board diagnostics (OBD) module, an OBD data logger, a controller area network bus, a cooling unit, a charging unit, a data storage unit, a solar panel, an advanced driver assistance system (ADAS), a navigation system, a graphical processing unit (GPU), a tensor processing unit (TPU), a microphone, a speaker, a vehicle Internet of Things (IoT) module, a head-up display (HUD), a media center, a lidar sensor, a radar sensor, a driver or passenger wearable device, and a vehicle-to-vehicle (V2V) connection chip.

3. The modularized system of claim 1, wherein each module that generates data comprises a memory module to archive data that is deemed less important.

4. The system of claim 1 wherein some or all of said modules are connected via a stack using USB-C, which provides synchronous power and data delivery.

5. The system of claim 4 wherein the data and power in stacked modules are used for cooling, whereby stacked modules are connected to a cooling heatsink/active cooling unit by an air tube or by a heat conductor.

6. The system of claim 1 wherein some or all of said modules are communicatively chained by Wi-Fi or Bluetooth or another common wireless protocol, and propagate data from one module to another along the chain, up to a cellular module.

7. The system of claim 1 wherein some or all of said modules are connected via a hub.

8. The system of claim 1 wherein data is transmitted between some or all of said modules by using the vehicle's metallic body to generate a low amplitude AC signal which is transmitted to and amplified in the modules.

9. The system of claim 1 wherein some or all of said modules are directly connected to a controller area network (CAN) vehicle bus, and are thereby connected to other sub-systems in the vehicle.

10. The system of claim 1 comprising a smartphone that serves as a hub, the smartphone providing storage, computing, and an access point for cloud storage, and wherein one or more of said modules is a camera connected to said smartphone via Wi-Fi or Bluetooth.

11. The system of claim 1 further comprising at least one additional hardware connection unit, communicatively chained with one another and with said hardware connection unit, so as to enable wide coverage for large vehicles.

12. The system of claim 1 wherein said modules comprise a multi-camera array, the outputs of which are combined to form a synthesized view of the surrounding of the vehicle.

13. The system of claim 1 wherein each said module that is wireless, is paired with the system using near-field communication (NFC) or BLE communication.

14. The system of claim 1 wherein at least one of said modules comprises internal data integrity tests, and upon failure the at least one module reports the failure to said hardware connection unit, and said hardware unit reports the failure to the cloud services, and the failure is displayed using the dedicated smartphone application or the cloud dashboard.

15. The modularized system of claim 1, whereby each module that generates data comprises a main storage unit and other storage units that are configured to save recorded data, and wherein the main storage unit synchronizes data between storage units for purpose of data redundancy.

16. A modularized system for assembling electronic systems within vehicles, comprising:
 a hardware connection unit embedded in a vehicle;
 a plurality of modules in the vehicle, communicating with said hardware connection unit, either by direct support or by an adaptor, and communicating with each other either by wired or by wireless communication;
 a cellular device in the vehicle, communicating with said hardware connection unit and with one or more cloud services, and downloading firmware and software for said modules from the one or more cloud services; and
 a vehicle on-board diagnostics (OBD) system serving as a main port, comprising an adaptor to a camera, said adaptor comprising an internal USB and an internal SD card adaptor, wherein the camera communicates with said hardware connection unit via Wi-Fi, via Bluetooth Low Energy (BLE) communication, or via USB,
 wherein the system is viewed and modified using a dedicated smartphone application or a cloud dashboard.

17. The modularized system of claim 16, wherein each module that generates data comprises a memory module to archive data that is deemed less important.

18. The modularized system of claim 16, whereby each module that generates data comprises a main storage unit and other storage units that are configured to save recorded data, and wherein the main storage unit synchronizes data between storage units for purpose of data redundancy.

19. The system of claim 16 wherein at least one of said modules comprises internal data integrity tests, and upon failure the at least one module reports the failure to said hardware connection unit, and said hardware unit reports the failure to the cloud services, and the failure is displayed using the dedicated smartphone application or the cloud dashboard.

20. The system of claim 16 wherein each said module that is wireless, is paired with the system using near-field communication (NFC) or BLE communication.

21. The system of claim 16 wherein said modules comprise a multi-camera array, the outputs of which are combined to form a synthesized view of the surrounding of the vehicle.

22. The system of claim 16 further comprising at least one additional hardware connection unit, communicatively chained with one another and with said hardware connection unit, so as to enable wide coverage for large vehicles.

23. The system of claim 16 comprising a smartphone that serves as a hub, the smartphone providing storage, computing, and an access point for cloud storage, and wherein one or more of said modules is a camera connected to said smartphone via Wi-Fi or Bluetooth.

24. The system of claim 16 wherein said cellular device is a smartphone and wherein said plurality of modules comprises sensors from the group consisting of a camera including a vehicle rooftop camera, a drone, a GPS, wearable electronic devices comprising smart watches, camera glasses, and health monitors, a cellular access point, inertial measurement unit (IMU) sensors, an on-board diagnostics (OBD) module, an OBD data logger, a controller area network bus, a cooling unit, a charging unit, a data storage unit, a solar panel, an advanced driver assistance system (ADAS), a navigation system, a graphical processing unit (GPU), a tensor processing unit (TPU), a microphone, a speaker, a vehicle Internet of Things (IoT) module, a head-up display (HUD), a media center, a lidar sensor, a radar sensor, a driver or passenger wearable device, and a vehicle-to-vehicle (V2V) connection chip.

25. The system of claim 16 wherein some or all of said modules are communicatively chained by Wi-Fi or Bluetooth or another common wireless protocol, and propagate data from one module to another along the chain, up to a cellular module.

26. The system of claim 16 wherein some or all of said modules are connected via a hub.

27. The system of claim 16 wherein data is transmitted between some or all of said modules by using the vehicle's metallic body to generate a low amplitude AC signal which is transmitted to and amplified in the modules.

28. The system of claim 16 wherein some or all of said modules are directly connected to a controller area network (CAN) vehicle bus, and are thereby connected to other sub-systems in the vehicle.

29. A modularized system for assembling electronic systems within vehicles, comprising:
 a hardware connection unit embedded in a vehicle;
 a plurality of modules in the vehicle, communicating with said hardware connection unit, either by direct support or by an adaptor, and communicating with each other either by wired or by wireless communication, wherein at least one of said modules comprises its own storage for buffering data and for backing up data, and whereby, in response to an event, at least one storage in at least one of said modules captures higher rate data for a defined duration, so as to allow for slow motion;
 a cellular device in the vehicle, communicating with said hardware connection unit and with one or more cloud services, and downloading firmware and software for said modules from the one or more cloud services; and
 an artificial intelligence (AI) module, triggering an event across said storage in at least one of said modules, to mark part of the stored data for different modes of deletion, comprising a delayed deletion mode and a never-to-be-deleted mode, wherein the system is viewed and modified using a dedicated smartphone application or a cloud dashboard.

30. The modularized system of claim 29, wherein each module that generates data comprises a memory module to archive data that is deemed less important.

31. The modularized system of claim 29, whereby each module that generates data comprises a main storage unit and other storage units that are configured to save recorded data, and wherein the main storage unit synchronizes data between storage units for purpose of data redundancy.

32. The system of claim 29 wherein at least one of said modules comprises internal data integrity tests, and upon failure the at least one module reports the failure to said hardware connection unit, and said hardware unit reports the failure to the cloud services, and the failure is displayed using the dedicated smartphone application or the cloud dashboard.

33. The system of claim 29 wherein each said module that is wireless, is paired with the system using near-field communication (NFC) or BLE communication.

34. The system of claim 29 wherein said modules comprise a multi-camera array, the outputs of which are combined to form a synthesized view of the surrounding of the vehicle.

35. The system of claim 29 further comprising at least one additional hardware connection unit, communicatively chained with one another and with said hardware connection unit, so as to enable wide coverage for large vehicles.

36. The system of claim 29 comprising a smartphone that serves as a hub, the smartphone providing storage, computing, and an access point for cloud storage, and wherein one or more of said modules is a camera connected to said smartphone via Wi-Fi or Bluetooth.

37. The system of claim 29 wherein said cellular device is a smartphone and wherein said plurality of modules comprises sensors from the group consisting of a camera including a vehicle rooftop camera, a drone, a GPS, wearable electronic devices comprising smart watches, camera glasses, and health monitors, a cellular access point, inertial measurement unit (IMU) sensors, an on-board diagnostics (OBD) module, an OBD data logger, a controller area network bus, a cooling unit, a charging unit, a data storage unit, a solar panel, an advanced driver assistance system (ADAS), a navigation system, a graphical processing unit (GPU), a tensor processing unit (TPU), a microphone, a speaker, a vehicle Internet of Things (IoT) module, a head-up display (HUD), a media center, a lidar sensor, a radar sensor, a driver or passenger wearable device, and a vehicle-to-vehicle (V2V) connection chip.

38. The system of claim 29 wherein some or all of said modules are communicatively chained by Wi-Fi or Bluetooth or another common wireless protocol, and propagate data from one module to another along the chain, up to a cellular module.

39. The system of claim 29 wherein some or all of said modules are connected via a hub.

40. The system of claim 29 wherein data is transmitted between some or all of said modules by using the vehicle's metallic body to generate a low amplitude AC signal which is transmitted to and amplified in the modules.

41. The system of claim 29 wherein some or all of said modules are directly connected to a controller area network (CAN) vehicle bus, and are thereby connected to other sub-systems in the vehicle.

42. A modularized system for assembling electronic systems within vehicles, comprising:

a hardware connection unit embedded in a vehicle;

a plurality of modules in the vehicle, communicating with said hardware connection unit, either by direct support or by an adaptor, and communicating with each other either by wired or by wireless communication, wherein at least one of said modules comprises its own storage for buffering data and for backing up data;

a cellular device in the vehicle, communicating with said hardware connection unit and with one or more cloud services, and downloading firmware and software for said modules from the one or more cloud services, whereby said cellular device syncs data with the cloud storage when a cellular connection is available, and wherein the cloud storage is set to the never-to-be-deleted mode; and an artificial intelligence (AI) module, triggering an event across said storage in at least one of said modules, to mark part of the stored data for different modes of deletion, comprising a delayed deletion mode and a never-to-be-deleted mode, wherein the system is viewed and modified using a dedicated smartphone application or a cloud dashboard.

43. The modularized system of claim 42, wherein each module that generates data comprises a memory module to archive data that is deemed less important.

44. The modularized system of claim 42, whereby each module that generates data comprises a main storage unit and other storage units that are configured to save recorded data, and wherein the main storage unit synchronizes data between storage units for purpose of data redundancy.

45. The system of claim 42 wherein at least one of said modules comprises internal data integrity tests, and upon failure the at least one module reports the failure to said hardware connection unit, and said hardware unit reports the failure to the cloud services, and the failure is displayed using the dedicated smartphone application or the cloud dashboard.

46. The system of claim 42 wherein each said module that is wireless, is paired with the system using near-field communication (NFC) or BLE communication.

47. The system of claim 42 wherein said modules comprise a multi-camera array, the outputs of which are combined to form a synthesized view of the surrounding of the vehicle.

48. The system of claim 42 further comprising at least one additional hardware connection unit, communicatively chained with one another and with said hardware connection unit, so as to enable wide coverage for large vehicles.

49. The system of claim 42 whereby a policy of when and where said cellular device syncs data from said modules with the cloud storage is configurable by a user via Wi-Fi communication using a home Wi-Fi access point or a public Wi-Fi access point, or via cellular communication, and wherein the user specifies a data profile and a data rate for at least one of said modules and for at least one available Internet network.

50. The system of claim 42 wherein said cellular device is a smartphone and wherein said plurality of modules comprises sensors from the group consisting of a camera including a vehicle rooftop camera, a drone, a GPS, wearable electronic devices comprising smart watches, camera glasses, and health monitors, a cellular access point, inertial measurement unit (IMU) sensors, an on-board diagnostics (OBD) module, an OBD data logger, a controller area network bus, a cooling unit, a charging unit, a data storage unit, a solar panel, an advanced driver assistance system (ADAS), a navigation system, a graphical processing unit (GPU), a tensor processing unit (TPU), a microphone, a speaker, a vehicle Internet of Things (IoT) module, a head-up display (HUD), a media center, a lidar sensor, a radar sensor, a driver or passenger wearable device, and a vehicle-to-vehicle (V2V) connection chip.

51. The system of claim 42 wherein some or all of said modules are communicatively chained by Wi-Fi or Bluetooth or another common wireless protocol, and propagate data from one module to another along the chain, up to a cellular module.

52. The system of claim 42 wherein some or all of said modules are connected via a hub.

53. The system of claim 42 wherein data is transmitted between some or all of said modules by using the vehicle's metallic body to generate a low amplitude AC signal which is transmitted to and amplified in the modules.

54. The system of claim 42 wherein some or all of said modules are directly connected to a controller area network (CAN) vehicle bus, and are thereby connected to other sub-systems in the vehicle.

55. The system of claim 42 comprising a smartphone that serves as a hub, the smartphone providing storage, computing, and an access point for cloud storage, and wherein one or more of said modules is a camera connected to said smartphone via Wi-Fi or Bluetooth.

* * * * *